INVENTORS
GUS E. MEVERS
DAVID B. POLLOCK
BY
ATTORNEY

Oct. 14, 1969     G. E. MEVERS ET AL     3,473,030

LIGHT CONTROL METHOD AND APPARATUS

Filed Sept. 15, 1964

INVENTORS
GUS E MEVERS
DAVID B POLLOCK
BY
Richard L. Seiber
ATTORNEY

United States Patent Office 3,473,030
Patented Oct. 14, 1969

3,473,030
LIGHT CONTROL METHOD AND APPARATUS
Gus E. Mevers, Redondo Beach, and David B. Pollock, Huntington Beach, Calif., assignors to North American Rockwell Corporation, a corporation of Delaware
Filed Sept. 15, 1964, Ser. No. 396,620
Int. Cl. H04b 9/00
U.S. Cl. 250—199        6 Claims

ABSTRACT OF THE DISCLOSURE

Means are provided for amplitude modulating a hemispherical mode laser by varying the effective reflectivity of one end thereof by reflecting laser light back into the laser from a Fabry-Perot interferometer outside one mirror thereof. One mirror of the laser and a second mirror spaced therefrom form the interferometer. The second mirror is one face of a piezoelectric transducer so that the length of the optical resonating cavity of the interferometer is selectively variable in response to an electrical signal. In a preferred embodiment the transducer is mounted in the bottom of a cup rigidly connected to the laser end mirror.

---

This invention relates to modulation of a light source and more particularly relates to amplitude control of a laser.

Because of the very high frequencies of the oscillation of light there is considerable interest in modulating a light beam for the transmission of information. Communication systems employing light sources have become practical recently, particularly because of developments in optical masers or lasers. Previously available modulatschemes have involved delicate instruments requiring the maintenance of precise optical alignment and have involved substantial size and weight. Previously available modulating devices have operated on the light beam after it leaves the laser cavity rather than affecting laser action.

It is therefore a broad object of this invention to provide a small light weight optical modulator.

It is another broad object of this invention to control the operation of a laser.

Thus in the practice of this invention according to a preferred embodiment there is provided a laser cavity resonator having partially reflective end mirrors. Parallel to one of the reflective end mirrors of the laser cavity there is provided another mirror. This mirror in combination with the reflective surface of the laser mirror forms an interferometric optical cavity resonator in series with the laser optical cavity resonator. A piezoelectric transducer supporting the auxiliary mirror varies the length of the second cavity resonator and in effect varies the reflectivity of one end of the laser cavity. Variation of the effective reflectivity of the laser cavity end mirror causes a variation in the output of the laser. This variation in the laser light output is employed for transmitting an information bearing signal.

It is therefore a broad object of this invention to modulate a laser.

It is another object of this invention to provide a modulated light beam.

Figure 1:
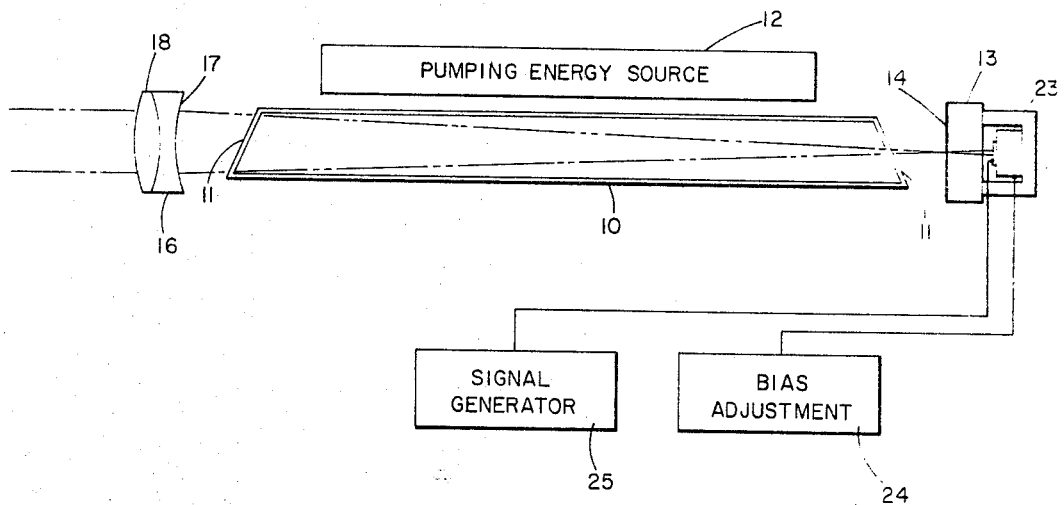
Figure 2:
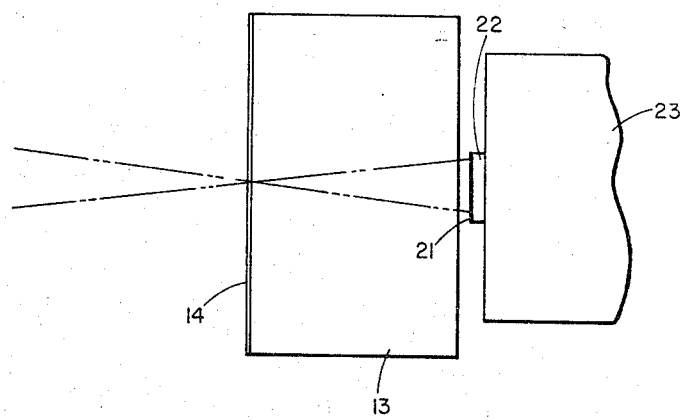
Figure 3:
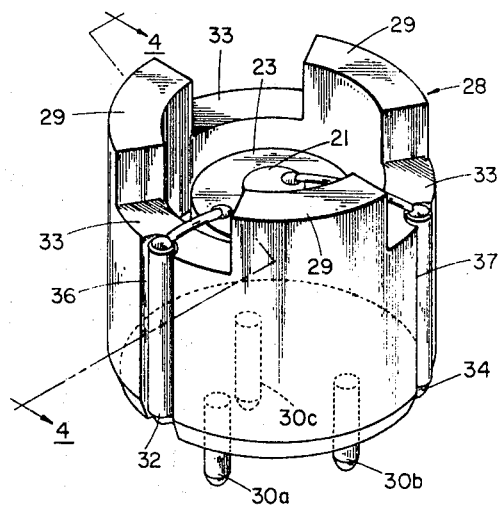
Figure 4:
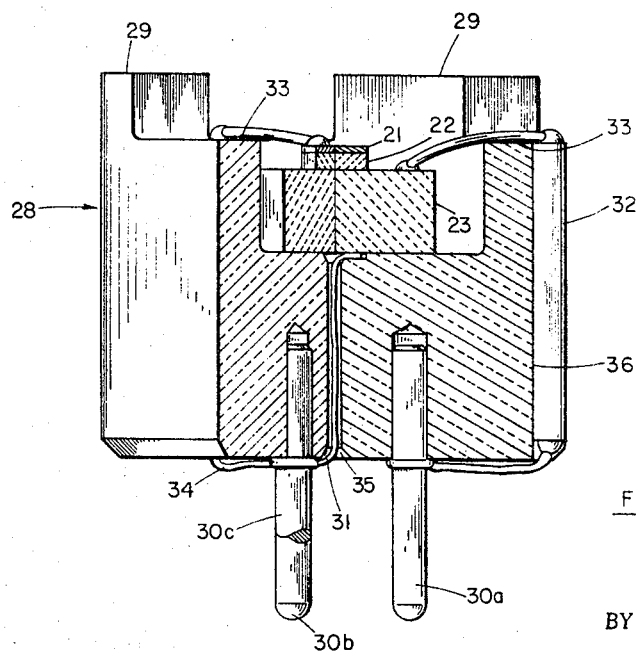

Other objects and many of the attendant advantages of this invention will be readily appreciated as the same becomes better understood by reference to the following detailed description when considered in connection with the accompanying drawings wherein:

FIG. 1 illustrates a laser modulation system;
FIG. 2 illustartes schematically of an optical cavity resonator formed on the end of the laser cavity;
FIG. 3 is a perspective view of a modulator for attachment to a laser end mirror; and
FIG. 4 is a section view of the modulator of FIG. 3.

Throughout the drawings like numerals refer to like parts.

An optical maser, which has come to be better known as a laser, comprises an elongated chamber having reflective end plates and an active laser medium in the chamber forming an optical cavity resonator many wave lengths long. The active laser medium comprises a material having suitable electron energy relationships so that non-equilibrium population distributions can be generated. When a population inversion is generated in the active medium by pumping with light of high frequency or the like, a photon of a characteristic frequency stimulates radiation of the same frequency. By providing reflecting end plates on a cavity containing the active medium, light of the characteristic frequency is reflected through the resonator a large number of times in order to stimulate a large amount of radiation of the characteristic frequency. This avalanche of light is monochromatic and coherent. The end plates on the cavity resonator are usually partially transmissive so that a useful beam of light is obtained therethrough. Many lasers have been described which operate in this manner such as, for example, that described in U.S. Patent 2,929,922 entitled "Maser and Maser Communications System" by A. L. Schawlow and C. H. Townes, or that described by A. Javan, W. R. Bennett, Jr., and D. R. Herriott in "Physical Review Letters" 6 (1961) 106. These or other lasers can be employed in the practice of this invention.

It is preferred that the laser be a continuous wave laser so that a continuous beam of radiation is obtained. A typical laser for use in this invention comprises a helium-neon gas laser which has a monochromatic beam with a wave length of 6328.17 Angstroms in the red region of the visible spectrum. A suitable laser light source is a continuous wave gas laser such as the Model 110 manufactured by Perkin-Elmer Spectra-Physics, Inc.

Elements of a laser having the modulating features provided according to the practice of this invention are illustrated in FIG. 1. Here there is provided an elongated chamber 10 having an active medium therein. As mentioned above, this medium is preferably a helium-neon mixture so that continuous operation is obtained. Other gas mixtures have been described and are advantageously employed in the practice of this invention. Solid or liquid mediums are available and those that produce continuous operation are suitable for use in this invention. The chamber has transparent windows at either end thereof. It is preferred but not necessary that the windows 11 be angulated relative to the axis of the chamber at the Brewster's angle for a particular wave length so that a selected mode of plane polarization of the light beam is obtained. A pumping energy source 12 provides energy to the active medium in the chamber to set up the required non-equilibrium population distribution. Laser action is initiated when the pump power produces a population inversion in the energy level system of the gas mixture in the chamber 10.

Adjacent one end of the chamber 10 there is provided a plane end mirror 13 having a reflective surface 14 facing the chamber. At the opposite end of the chamber 10 there is provided a mirror 16. This mirror has a concave reflective surface 17 on the side facing the chamber 10. The mirrors 13 and 16 are constructed of a material such as quartz that is transparent to the radiation of the laser. The mirror 16 has secured thereto a lens 18 of suitable focal length for providing a collimated output light beam from the laser. The curvature of the reflective surface 17 is a sphere with its focus on the plane reflective surface 14. Light reflected from the spherical surface 17 along a converging path, as shown with exaggerated angle in FIG. 1, passes through the active laser medium in the chamber 10 and is in turn reflected from the plane surface 14. As light is reflected back and forth between the reflective surfaces 17 and 14 on the end mirrors, electron radiation is stimulated in the active laser medium and the amplitude of the light beam increases. A laser so constructed is one that operates in what is known as a hemispherical mode, a name deriving from the use of a single spherical segment reflector 17 at one end of the laser cavity resonator, and a plane mirror surface 14 at the opposite end. Lasers are also operated in a plane mode having plane end mirrors forming the resonator or in a confocal mode wherein both end mirrors are concave spherical reflectors. The end mirrors have been illustrated external to the chamber containing the active medium, however, it is apparent that the end mirrors can also be arranged inside the chamber or as ends for a gas containing chamber or as coatings on a solid active laser medium.

The reflective surfaces 14 and 17 may be formed by evaporating thin films of silver, aluminum or other reflective materials on the mirror surfaces. Similarly dielectric coatings can be employed. The resulting structure is preferably not completely reflective so that a useful light beam is obtained from the laser. The surfaces must, however, be highly reflective so that light will resonate within the cavity containing the active medium, otherwise laser action may not occur. It is preferred that the end mirrors be about 98% to 99% reflective and about 1% to 2% transmissive in the wave length range of interest. This 1% to 2% of the light is transmitted through the transparent body of the mirrors to form a useful beam. The light transmitted through the concave reflective surface 17 is slightly divergent as if coming from a point source and is operated on by the lens 18 so that it is collimated to provide a low dispersion output beam.

FIG. 2 shows in somewhat greater detail and with exaggerated angle the path of the laser light at the mirror 13. Since the concave reflective surface 17 has its focus at the plane reflective surface 14 the light beam is convergent at the plane. A small proportion of the light is transmitted through the reflective surface 14 and through the transparent material 13 to impinge on a second plane mirror 21 placed near the mirror 13. The reflective surface 21 is plane and spaced a short distance from the plane mirror surface 14. When closely spaced it is found that light losses due to beam divergence are minimal and good modulation is obtained. The distance between the two plane reflective surfaces should be small compared with the length of the laser cavity resonator so that the light impinging on the second mirror 21 is substantially focused. Light impinging on the reflective surface 21 is retrodirected back through the reflective surface 14 into the laser cavity.

Since the reflective surface 14 on the laser end mirror is reflective to light from either direction most of the light originally transmitted therethrough is reflected between this reflective surface and the second reflective surface 21 and oscillates therebetween. The combination of the reflective surfaces 14 and 21 spaced a short distance apart forms an optical cavity resonator, the dimensions of which will affect the characteristics of the light oscillating therein. Such an optical cavity resonator is known as a Fabry-Perot interferometer. A Fabry-Perot interferometer is a multiple beam interferometer comprising two parallel plates of glass or quartz separated a short, known distance, and with surfaces partially silvered so as to increase reflection without being fully opaque. The surfaces 14 and 21 form such an interferometer. It is preferred that the percentage reflectivity of the two surfaces be substantially the same so that the Q of the cavity resonator is maximized and maximum depth of modulation is obtained for a given driving signal.

In effect the Fabry-Perot interferometer formed by spaced reflective surfaces 14 and 21 is an arrangement for controlling reflectivity at one end of the cavity that contains the active laser medium. Variation of such reflectivity will vary the amplitude of the laser output. Accordingly the laser output is modulated by modulating reflectivity at one end of the laser cavity. This reflectivity is modulated by modulating reflectivity of the Fabry-Perot interferometer.

In order to control the reflectivity of the interferometer, means are provided for varying the length of the resonator in response to an electrical signal. A piezoelectric signal transducer 22 is employed as a mounting for the reflective mirror 21. The piezoelectric signal transducer 22 is in turn mounted on a piezoelectric bias transducer 23, the opposite surface of which is preferably rigidly secured to the laser end mirror 13. A voltage source 24 (FIG. 1) is provided for applying an adjustable D.C. electric field across the bias transducer 23. By adjusting the magnitude of the voltage across the bias transducer a steady selected variation in the distance between one surface thereof and the reflective surface 14 is provided. It will be recognized that a magnetostrictive transducer or the like may also advantageously be employed in the practice of this invention.

Additionally there is provided a signal generator 25 which provides an information bearing electrical signal to the signal transducer 22. The signal generator 25 is any conventional source such as a television camera and video amplifier, microphone and audio amplifier or wave generator depending on the type of information to be impressed upon the light beam. The resultant signal is in the form of a voltage which is applied across the signal transducer to cause a mechanical displacement of the piezoelectric element, consequently a variation in the space between reflective surface 21 and the reflective surface 14. Thus the length of the cavity resonator is varied in response to an electrical signal.

In an interferometer light energy is not lost except for minor absorptions or scattering. In a Fabry-Perot interferometer the light entering the optical cavity resonator is transmitted out of the cavity through one end or the other. If transmitted out of the end from which it enters, the interferometer appears to be a nearly perfect reflector, and if transmitted out of the opposite end, it appears virtually transparent to incident light. Minimum reflectance from the resonator occurs when the cavity resonator length is precisely an integral number of half wave lengths of light long and at other points the transmittance of the resonator is low and the reflectance high. When the reflectivities of the two mirrors forming the cavity are equal, the maximum Q for the cavity is obtained and the greatest magnitude of change between reflectance and transmittance is obtained for a given driving signal on the transducer.

The light reflected from the interferometer formed by the mirrors 14 and 21 is retrodirected into the laser cavity and serves to stimulate emission of further light. When the optical cavity resonator is turned to transmit light so that it does not re-enter the laser cavity, the apparent reflectivity of the end mirror is reduced, the magnitude of the laser action is reduced and the amplitude of the light output is reduced. With proper tuning of the interferometer it is found that the laser action ceases due to lack of sufficient resonating light in the laser cavity. Similarly when the interferometer is tuned for maximum reflectance, virtually no light is lost from one end of the laser cavity and the laser activity increases. Surprisingly it is found that the total power in the light output beam is increased to as much as five times the normal laser output power, and continued operation at 3.5 times the power output without the interferometer is readily obtained. The best power gains obtained by other means such as making one end mirror totally reflecting have been in the order of only 1.8 times the normal power output.

It is preferred that the mirror surface 21 on the piezoelectric transducer be plane and that the distance between this surface and the mirror surface 14 of the laser cavity be as short as possible. Due to the long focal length of a laser's concave mirror surface 17, the laser beam diameter is very small at the flat mirror end. By placing the transducer mirror adjacent the plane mirror, the beam diameter on the transducer mirror is virtually the same as the focal spot diameter on the plane end mirror. Because of the very large $f$-number the focused beam has very small divergence and the spherical wavefronts can be considered plane wavefronts for reflection purposes for a reasonable distance adjacent the focal plane. Within this range, the interferometer operates with only a minimum of beam walk-off. To minimize walk-off, a concave reflective surface can be used on the transducer mirror, but good results are obtained from a plane mirror and in operations of the type that has been achieved there has been no need to employ the more expensive concave mirror.

Thus, for example, it has been found in operating a 60 cm. long hemispherical mode laser that the plane transducer mirror can be as much as 39 mm. from the plane end mirror and depth of modulation of 100% is obtained. Depth of modulation here is compared with the laser output without the interferometer being active. Thus at 100% depth of modulation, the swing between maximum and minimum intensity is equal to the normal laser output. A steadily increasing depth of modulation is obtained as the plane transducer mirror is moved nearer the plane end mirror which is just opposite to the effect found in a Fabry-Perot interferometer illuminated with collimated light. The effect is ascribed to the divergence of the light in this instance. Additionally it is desirable to have a minimum length to the interferometer to minimize the resolution of the cavity and minimize frequency mode suppression. Depths of modulation of about 140% have been observed with a cavity resonator length of about 20 mm. adjacent the 60 cm. laser mentioned. Actual depth of modulation compared with the maximum laser output at a given cavity length is in excess of 50% for all cavity lengths up to about 80 mm. It is also found that slight angular misalignment of the transducer mirror can be tolerated without degradation of the depth of modulation obtained. There is virtually no decrease in depth of modulation with angular deviations of ±1 minute of arc between the laser cavity end mirror and the transducer mirror. The .707 amplitude points are at about ±2½ minutes of arc.

It is preferred that the laser employed be operated in a hemispherical mode so that the light beam diameter is very small at one end of the laser cavity. Since the beam diameter is very small, the transducer mirror and the signal transducer can also be quite small. This is of importance in that the frequency of the first resonance in the transducer is a function of its size, with higher frequency resonances being associated with smaller transducers. It is preferred to operate the signal transducer at a frequency below about two-thirds of its first resonant frequency for maximum linearity of response. Below this frequency the mechanical distortion of the piezoelectric material is proportional to the electric signal and the amplitude modulation obtained from the laser has a minimum distortion. Large transducer mounted mirrors can be employed with plane or confocal mode lasers, but with decreased linearity of transducer response. Auxiliary lenses can be used to obtain small mirror sizes at the expense of simplicity and ease of optical alignment.

It has been found that the output of the laser is amplitude modulated at frequencies above the switching time of the laser itself. Thus, for example, the He-Ne laser described has been amplitude modulated at frequencies up to 1 megacycle when the switching time of the laser corresponds to a frequency less than 100 kc. The modulator can be operated so that the laser is turned on and off which is a useful means for providing intermittent spots of light, but the time required to commence laser activity is too long for high speed communications and it is preferred to employ continuous amplitude modulated output.

FIGS. 3 and 4 illustrate a preferred embodiment of transducer mounting means for use in the practice of this invention. This embodiment is readily optically aligned with the laser resonator and occupies a volume of less than 1/300 cubic inch. As illustrated therein there is provided a crenelated cup 28 which is preferably constructed of a material having a low thermal expansion coefficient, such as fused quartz, for greatest size stability. Three merlons 29 are provided on the cup 28 for securing to the end mirror of a laser. Three merlons are preferred for greatest mounting ease, and other numbers can be employed. The end mirror on a laser conventionally has two parallel surfaces, one of which is silvered. It is therefore convenient to cement or clamp the merlons against the opposite side of the laser end mirror so that the cup is accurately aligned with the end mirror. Three crenels 33 are provided between the merlons to give access to the cup and clearance for electrical leads.

Secured to the inside bottom of the cup is a piezoelectric bias transducer 23. The transducer is preferably of a material having a large displacement in a thickness direction for an applied electric field. Lead zirconium titanate has been found satisfactory and other piezoelectric materials can be employed. Quartz crystal can be employed if it is desired that the transducer be transparent. Thin metal films (not shown) are deposited on opposite faces of the bias transducer 23 for applying an electric field thereacross. Although a single piezoelectric element is employed in the illustrative embodiment as the bias transducer, it is also contemplated that a plurality of individual elements be used having a parallel electrical connection and series mechanical arrangement. A stack of individual disks having alternating polarity and alternatively imposed electric fields is used to obtain a greater displacement for a given voltage. Such an arrangement is described in detail in a co-pending application, Ser. No. 406,424 now Patent No. 3,420,600, by Gus E. Mevers and David B. Pollack entitled "Light Control Means" and assigned to North American Aviation, Inc., the assignee of this application.

On the opposite side of the bias transducer there is cemented a signal transducer 22 having a reflective coating 21 thereon. The transducer is preferably fabricated of lead zirconium titanate or other piezoelectric material. The reflective surface 21 is preferably metal such as gold so that it doubles as an electrical conductor for applying an electric field across the signal transducer. Although lead zirconium titanate is not transparent so that light is not transmitted therethrough, the interferometer operates properly due to absorption of light in the transducer body. Alternatively quartz may be employed as the piezoelectric material.

On the outside base of the cup 28 metal pins 30 are mounted for making electrical connection to a conventional socket (not shown). A preferred mounting technique has the metal pins cemented in holes in the quartz cup with a resilient cement to minimize the possibility of cracking due to thermal stresses. Alternatively the pins can be inserted in the fused quartz as a direct glass to metal bond. In either case, the pins and the quartz body are of quite small size and no thermal stress difficulties are observed. An electrical lead 31 is secured to one of the metal pins 30 and passes through an axial hole 35 in the base of the cup to make electrical contact with a deposited metal film on one side of the piezoelectric bias transducer 23. Another electrical lead 32 passes along the side of the cup in a shallow channel 36 and through one of the crenels 33 to the second conductive surface of the bias transducer. In operation these leads are electrically connected to the bias adjust 24 so that a D.C. voltage is applied across the bias transducer.

The second electrically conductive surface of the bias transducer is common with one side of the signal transducer 22, therefore the electrical lead 32 is also connected electrically with the signal generator 25 for applying an electric signal to the signal transducer. Another electrical lead 34 contacts the mirrored surface of the signal transducer, passes through a crenel 33 and along a channel 37 in the side of the cup to make contact with one of the metal pins. A signal from the signal generator is applied to the signal transducer by means of the two electrical leads 32 and 34, and a bias voltage is applied to the bias transducer by the leads 31 and 32.

In operation of the modulated laser, a population inversion is generated by pumping the active laser medium with the pumping source in a conventional manner. The bias adjust 24 is varied to apply a voltage across the bias transducer so that the surface supporting the signal transducer is moved relative to the end mirror of the laser. The bias is varied so that the mean intensity of the laser is about half way between the maximum available and the minimum for continued laser activity. This position gives the best linearity of response to a signal and the maximum depth of modulation for a given driving signal strength. An electrical signal is applied to the signal transducer by the signal generator. This causes a displacement of the mirrored surface of the transducer relative to the end mirror of the laser, hence a change in the length of the optical cavity resonator or Fabry-Perot interferometer. As described this causes a variation in the effective reflectivity of one end of the laser cavity, a variation in the light resonating in the active medium, and hence a variation in the intensity of the output laser beam. It is found that the intensity variation as monitored by a photodetector is exactly related to the signal imposed on the signal transducer.

It is to be understood that the above described embodiment is merely illustrative of the application of the principles of this invention. Those skilled in the art may readily devise other variations that will embody the principles of the invention. It is therefore to be understood that within the scope of the appended claims the invention may be practiced otherwise than as specifically described.

What is claimed is:

1. A method of continuously maximizing the output amplitude of a laser comprising:
   pumping the laser to stimulate emission of light;
   passing a portion of the light from said laser into a multiple beam interferometer arranged at an end thereof and external thereto, the length of said interferometer being no more than a ratio of about 80 to 600 relative to the length of said laser;
   tuning the length of said interferometer to provide a maximum reflected light output amplitude therefrom, said length being substantially different from an integral number of half wavelengths of light from said laser;
   returning the reflected light to said laser so as to re-enter said laser whereby the laser output amplitude is maximized by the effective reflectivity of the interferometer; and
   projecting light from said laser from an end thereof opposite from interferometer.

2. The method of modulating the output amplitude of a laser having a partially reflecting end mirror comprising:
   reflecting light transmitted through said end mirror from a second partially reflecting mirror having substantially the same reflectivity as said end mirror and arranged parallel to and a very short distance from said end mirror relative to the length of said laser so that at least a portion of the light reflected from the second mirror is transmitted through said end mirror, said very short distance being no more than a ratio of about 80 to 600 relative to the length of said laser;
   varying the distance between said end mirror and said second mirror in response to a signal; and
   projecting light from said laser from an end thereof opposite to said second mirror.

3. A method of modulating the output amplitude of a hemispherical mode laser having a plane partially reflecting end mirror comprising:
   reflecting light transmitted through the plane end mirror from a second plane mirror having the same reflectivity as the plane end mirror and spaced a short distance from the plane end mirror so that reflected light re-enters the laser, said second mirror having a diameter substantially the same as the beam diameter and being mounted on a piezo-electric material having substantially the same diameter as the mirror, said short distance being no more than a ratio of about 80 to 600 relative to the length of said laser;
   adjusting the distance between the end mirror and the second mirror to a length substantially different from an integral number of half wavelengths of light;
   electrostatically moving the second plane mirror relative to the plane end mirror in response to a varying electrical signal whereby high frequency amplitude modulation of said laser emission is obtained; and
   projecting light from said laser through the end opposite from said plane end mirror.

4. An amplitude modulatable laser comprising:
   a first end mirror having a spherical concave surface having a relatively high reflectivity and a relatively low transmissivity;
   a second end mirror having a plane surface having a relatively high reflectivity and a relatively low transmissivity located at the focus of the spherical surface;
   an active laser medium between said first and second end mirrors for stimulated emission of light;
   a rigid member secured to said second end mirror on the side opposite from said first end mirror;
   a piezo-electric signal transducer mounted on said rigid member and having a reflective plane surface parallel to and spaced from said second end mirror a distance no more than a ratio of about 80 to 600 relative to the distance between said first and second end mirrors, said reflective surface having substantially the same reflectivity as said second end mirror, said signal transducer having a diameter of the same order as the diameter of a light beam reflected from said first end mirror whereby high frequency amplitude modulation of said laser is effected upon applying an electric signal to said transducer.

5. A light modulator comprising:
   a laser having a first end mirror having a spherical concave surface having a relatively high reflectivity and a relatively low transmissivity;
   a second plane end mirror located at the focus of said first end mirror and having a relatively high reflectivity and a relatively low transmissivity;
   a third mirror aligned with said second end mirror and having a reflectivity substantially the same as the reflectivity of said second end mirror, said third mirror being spaced from said second end mirror a distance no more than about 80 to 600 relative to the distance between said first and second end mirrors;
   an active laser medium between said first end mirror and said said end mirror for stimulated emission of light;
   means for pumping said active medium for activating said active medium for stimulated emission of light;
   means for moving said third mirror relative to said second end mirror in response to a control signal, said means for moving comprising:
   a rigid member secured to said second end mirror on the opposite side from the said first end mirror;

a piezo-electric bias transducer mounted on said rigid member;

means for applying a bias voltage to said bias transducer whereby the distance between said second end mirror and said third mirror is adjustable for enhancing depth of modulation;

a signal transducer mounted on said bias transducer, said third partially reflective mirror comprising a reflective plane surface on said signal transducer, said signal transducer having a diameter of the same order as the diameter of a light beam reflected from said first end mirror; and means for applying a varying signal voltage to said signal transducer whereby high frequency amplitude modulation of said laser is effected upon applying an electric signal to said signal transducer.

6. A light amplitude modulator comprising:

a laser comprising a first end mirror having a spherical concave surface having a relatively high reflectivity and a relatively low transmissivity;

a second end mirror having a plane surface having a relatively high reflectivity and a relatively low transmissivity located at the focus of the spherical surface;

an active laser medium between said first and second end mirrors for stimulated emission of light;

means for pumping said active medium for activating said active medium for stimulated emission of light;

a crenelated cup having its open end rigidly secured to said second end mirror on the side opposite from said first end mirror;

a piezo-electric bias transducer having one surface rigidly secured to the inside base of said crenelated cup;

bias adjust means for applying a bias voltage across said bias transducer for varying the thickness of said piezo-electric bias transducer;

at least one electrical lead from said bias adjust means to said bias transducer being through a crenel of said crenelated cup;

a piezo-electric signal transducer rigidly secured to another surface of said bias transducer and having a plane surface spaced from and parallel to said second end mirror a distance having a ratio no more than about 80 to 600 relative to the distance between said first and second end mirrors, said plane surface having a reflectivity substantially the same as the reflectivity of said second end mirror the diameter of said signal transducer being of the same order as the diameter of a light beam reflected from said first end mirror and transmitted through said second end mirror for maximized frequency response; and means for applying a varying high frequency signal voltage across said signal transducer for varying the thickness thereof in response to the signal whereby the distance between said second end mirror and said third end mirror is varied for varying the effective reflectivity of the combined mirrors and retrodirecting at least a portion of light back into said active laser medium for proportional stimulated emission of light at an amplitude dependent on the effective reflectivity.

References Cited

UNITED STATES PATENTS

| | | | |
|---|---|---|---|
| 3,131,253 | 4/1964 | Zandman et al. | 178—5.4 |
| 3,134,837 | 5/1964 | Kisliuk et al. | |
| 3,302,027 | 1/1967 | Fried et al. | 250—199 |
| 3,339,073 | 8/1967 | Hunter | 250—199 |
| 3,243,722 | 3/1966 | Billings | 331—94.5 |
| 3,354,404 | 11/1967 | Boyle | 331—94.5 |

OTHER REFERENCES

L. E. Hargrove et al.: Applied Physics Letters, Locking of He-Ne Laser Modes Induced by Synchronous Intracavity Modulation.

RICHARD MURRAY, Primary Examiner

ALBERT J. MAYER, Assistant Examiner

U.S. Cl. X.R.

331—94.5; 332—7.51